United States Patent

[11] 3,625,896

| [72] | Inventors | Bradley S. Kirk<br>Plainfield;<br>Chester B. De Savigny, Millington, both of N.J. |
|---|---|---|
| [21] | Appl. No. | 735,465 |
| [22] | Filed | June 7, 1968 |
| [45] | Patented | Dec. 7, 1971 |
| [73] | Assignee | Air Reduction Company, Incorporated<br>New York, N.Y. |

[54] THERMAL INSULATING POWDER FOR LOW-TEMPERATURE SYSTEMS AND METHODS OF MAKING SAME
14 Claims, 6 Drawing Figs.

[52] U.S. Cl. .................................................... 252/62,
161/182, 161/193, 161/206
[51] Int. Cl. .................................................... F16l 59/02,
F16l 59/08, B32b 19/04
[50] Field of Search ............................................ 252/62;
161/182, 206, 193

[56] References Cited
UNITED STATES PATENTS

| 2,967,152 | 1/1961 | Matsch et al. | 252/62 |
| 3,007,596 | 11/1961 | Matsch | 220/9 |
| 3,015,626 | 1/1962 | Kingsbury | 252/62 |
| 3,020,234 | 2/1962 | Haumann | 252/62 |
| 3,055,831 | 9/1962 | Barnett et al. | 252/62 |
| 3,166,511 | 1/1965 | Matsch et al. | 252/62 |
| 3,169,927 | 2/1965 | Matsch | 252/62 |
| 3,467,535 | 9/1969 | Myles | 106/64 |

Primary Examiner—Harold Ansher
Attorneys—Francis B. Henry, Edmund W. Bopp and H. Hume Mathews ABSTRACT: A thermal insulation powder for a cryogenic-evacuated insulation system, consists of an improved mixture of an opacifying powder and a low-density powder having high resistance to heat conduction. Ground expanded perlite is a preferred example of the opacifier, and pyrogenic silica is a preferred example of the low-density powder, the latter being in the form of agglomerates between the comparatively coarse particles of the perlite, and making up about one-half or more of the mixture by volume. This preferred mixture is compatible with oxygen. More effective interposition of the agglomerates between the opacifier particles for improving thermal insulation properties is achieved by impact-milling the mixture for a definite period of time.

3,625,896

THERMAL INSULATING POWDER FOR LOW-TEMPERATURE SYSTEMS AND METHODS OF MAKING SAME

This invention relates to insulation systems, and in a preferred form to evacuated, oxygen-compatible thermal insulation powders for use in very low temperature systems.

Thermal insulation of liquid containers at cryogenic temperatures, for example, presents difficult problems where economical and practical means must be used for not only holding heat leak to a bare minimum, but also for ensuring against accidental detonation or explosion due to incompatibility of the insulating material with certain cryogenic liquids. Known systems having good thermal efficiency are found to be too expensive and/or unsafe for many commercial uses where accidental mixing of the cryogenic liquid and insulating powder is a possibility.

So-called "evacuated porous insulation" systems have been proposed and used, wherein a solid, usually an inexpensive powder of low heat conductivity, either alone or combined with an opacifying powder, such as metallic or carbon particles having heat reflectivity characteristics, occupies a gas-evacuated space. Although the evacuated insulation systems as compared with vacuum alone, further reduce heat leak to varying extents, a practical optimum from the commercial standpoint as regards acceptable thermal efficiency, economy and safety has not been achieved. As mentioned above, the latter factor is especially important where there is any possibility of reaction between the insulation and refrigerated liquids such as oxygen or liquid air.

A principal object of this invention is to provide an improved evacuated powder insulation system and method of making the same wherein high thermal efficiency and reasonably low cost are achieved.

A related object of the invention is to provide an improved thermal insulation powder and method of making the same, for evacuated insulation systems, wherein the powder has high resistance to both heat radiation transfer and heat conduction transfer, and is compatible with oxygen or oxygen-rich air that might condense accidentally into the insulation. A A further object is to provide an improved evacuated insulation powder consisting of a mixture of opacifier particles and an ultrafine carrier such as pyrogenic silica, wherein the carrier is interposed between individual particles of the opacifier in small agglomerates for substantially reducing heat transfer by conduction between the particles.

In practicing the invention, the insulation powder consisting of opacifier and carrier as defined below, is prepared by forcibly mixing the opacifier, preferably ground expanded perlite, with the carrier, preferably pyrogenic silica, the latter constituting approximately 5 to 40 percent by weight of the mixture, to make up in the specific instance, an oxygen-compatible insulation having good thermal properties. For obtaining superior thermal characteristics, the opacifier and carrier mixture is mill-processed as herein described until the carrier powder is dispersed to the extent that the opacifier particles are for practical purposes, thermally and physically separated by very small agglomerates of the carrier powder. The resulting product is found to have surprisingly and materially higher resistance to heat transfer by radiation and conduction than ordinary mixtures.

Other objects, features and advantages will appear from the following description with reference to the accompanying drawings, in which.

Figure 1:
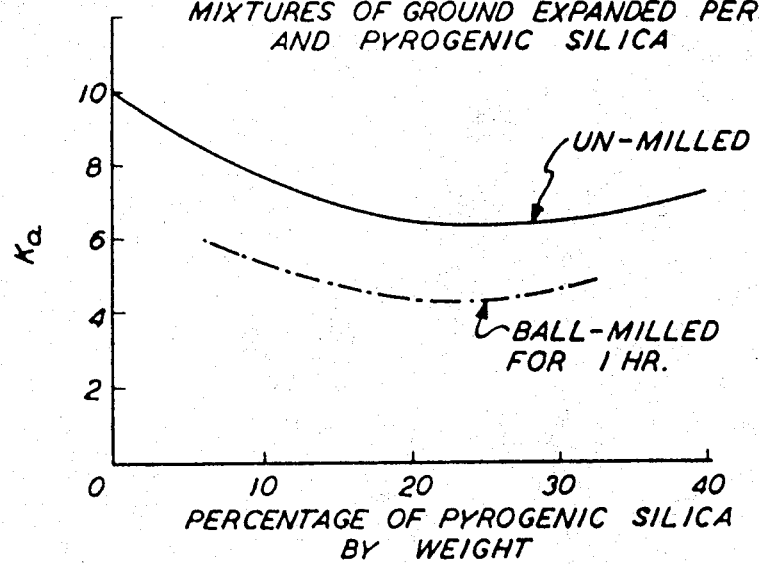
FIG. 1 is a graphical comparison of thermal properties of milled and unmilled insulation powder mixtures used in the invention.

Heat transfer through well-evacuated powder insulation is generally considered to take place by two methods, namely by thermal radiation directly through the insulation, and by solid conduction from particle to particle. The more effective powder insulations therefore, generally consist of a mixture of two powders, one herein called an opacifier, having high resistance to radiant heat transfer irrespective of its resistance to solid conduction, and the other, herein called a carrier, having high resistance to solid conduction irrespective of its resistance to radiation heat transfer. Well-known prior art examples of opacifers include aluminum flakes and carbon black, whereas fine silica, ceramic oxide and silicate powders and perlite have been proposed as carriers. However, where such opacifiers are used in insulation for oxygen vessels, for example, an accidental oxygen leak permeating the insulation creates an environment wherein detonation with very high explosive forces is a possibility. Insofar as presently known, none of the more thermally efficient cryogenic evacuated insulation powders now in use can with certainty safely insulate oxygen vessels, especially where used in transport. The same also applies under certain conditions to the insulation of hydrogen and other very low temperature fluid vessels, where an accidental leak in the insulation jacket would allow oxygen-rich air to condense in the insulation.

It was found in making this invention that ground expanded perlite, a glassy mixture primarily of inorganic silicates incapable of reacting chemically with oxygen, and commonly regarded simply as a poor heat conductor and low-cost carrier, is also a highly effective opacifier, and, that when mixed as hereinafter described, with a low-density carrier powder having high resistance to heat conduction, specifically, pyrogenic silica (also incapable of reacting with oxygen), results in a safe powder insulation having unexpected and surprisingly high resistance to heat leak. In fact, the better sample powder mixtures of the invention were found to have practically as good heat insulation properties as the highest grade opacified (metal or carbon) insulation powders presently known, which as mentioned above, are not compatible with oxygen. Pyrogenic silica, because of its very small particle size and low bulk density, is generally recognized as having very high resistance to solid conduction heat transfer, and comparatively low resistance to radiation heat transfer. Its function therefore is limited to that of a carrier in the insulation powder of the invention. It follows therefore, and as further evidenced below, that perlite which is a dielectric material, functions in the invention primarily as an opacifier, a heretofore unrecognized thermal property of perlite. This recognition of perlite as an effective opacifier, notwithstanding its commonly accepted use as a carrier, is an important aspect of the invention.

Perlite is a volcanic glass that contains a significant amount of occluded water. When this mineral is finely ground and then rapidly heated, the water vapor pressure expands the now softened mineral to particles of glassy froth called expanded perlite. The diameter of the expanded particles is ordinarily of the order of hundred of microns. The expanded perlite can be further ground to yield flakelike particles ranging from fines to about 100 microns in major dimension. This material in both expanded and ground expanded forms is available commercially and is quite inexpensive.

Pyrogenic silica is a silicon dioxide prepared by vapor phase chemical reaction, and consists of spherical particles of diameters from about 100 to 200 Angstroms grouped in large agglomerates. On a weight basis, this material is comparatively expansive but because of low bulk density (ranging from about 2 to 4 pounds per cubic foot) it is not unreasonably expensive on a volume basis. As used herein, pyrogenic silicas are available commercially under several trade names, e.g. "Cab-OlSil" and "Santocel."

A preferred method of preparing an insulation mixture embodying the invention follows: the opacifier, specifically expanded or ground expanded perlite in this instance, is placed together with pyrogenic silica, in suitable mechanical impact apparatus, such as a simple ball mill, the silica ranging from 5 to 40 percent of the total mixture by weight, depending on practical considerations of thermal characteristics and cost. The mixture is then agitated and subject to mechanical impact by operation of the ball mill. The duration of this impact-milling will vary according to the size and design of the mill; periods of from one-half to 1 hour were found to be sufficient, using a small, laboratory ball mill of about 3 gallons capacity rotating at about 40 r.p.m. and having a plurality of balls of ceramic material. Where expanded, rather than ground expanded perlite is initially used, the milling described above is sufficient to reduce the expanded perlite to the desired ground size, namely about 100 microns in major dimension.

Several powder mixtures of the invention were so prepared, and tested as listed below, according to standard procedure for determining "apparent thermal conductivity," $k_a$, of well-compacted and settled samples. The value of $k_a$, which has a positive relation to heat transfer, is determined according to insulation boundary layer temperatures, the $k_a$ values herein being based on boundary temperatures of 77° and 300° K. As used herein, the term "$k_a$" refers to the thermostatic formula:

$$k_a = qL/A \cdot \Delta T,$$

wherein $q$ is the rate of heat transfer (in microwatts) through a normal area $A$ (cm.$^2$), of an insulation layer of thickness $L$ (cm.), under a temperature-driving force $\Delta T$ (°K.).

Thus the value of $k_a$ decreases with decrease of rate of heat transfer, the other factors remaining constant. The mixture density, $\rho$, was also determined as this physical property has practical significance, especially in transportable insulated vessels of large capacity where gross weight cannot be excessive.

TABLE I

Milled Mixture of Ground Expanded Perlite and "Cab-O-Sil H5" (Pyrogenic Silica) Ball-milled for 1 Hour

| % by weight | | | $\rho$ |
|---|---|---|---|
| Perlite | Cab-O-Sil | $k_a$ | (gm./cc.) |
| 90 | 10 | 5.2 | 0.27 |
| 80 | 20 | 4.4 | 0.20 |
| 70 | 30 | 4.7 | 0.18 |

TABLE II

Unmilled Mixture of Ground Expanded Perlite and "Cab-O-Sil H5"

| 90 | 10 | 7.5 | 0.19 |
| 80 | 20 | 6.2 | 0.14 |
| 70 | 30 | 6.5 | 0.11 |
| 60 | 40 | 7.2 | 0.09 |

It will be seen from the milling tests above, table I, and from the chart, FIG. 1, based thereon, that the proportion of this specific grade of low heat conducting silica (Cab-O-Sil H5) in the mixture used is an optimum at around 20 percent, where a $k_a$ value of 4.4 is achieved. This is comparable for practical purposes, with the $k_a$ values of the best presently known opacified powders referred to above. The corresponding unmilled mixture, table II, had a minimum $k_a$ value of 6.2, i.e. about 41 percent higher than for the milled mixture.

It is also seen from table I and FIG. 1 that as the proportion of pyrogenic silica is further increased to 30 percent and the perlite correspondingly decreased, the $k_a$ value of the mixture starts to increase so that the optimum no longer obtains. This change represents an increase in radiant heat transfer that more than offsets the coincident decrease in heat transfer by conduction. This would confirm the present assumption that the perlite functions here primarily as an opacifier. That is, reduction in amount of the opacifier would naturally tend to increase radiant heat transfer since the pyrogenic silica by itself, although having, as is well known, very high resistance to heat transfer by conduction, has low resistance to radiant heat transfer. Conversely, for the lower proportion of pyrogenic silica, where $k_a$ also rises above the optimum, the heat transfer by conduction is obviously higher, since notwithstanding the increased amount of perlite, it has much less resistance to heat conduction than pyrogenic silica.

Accordingly, it is seen that perlite, a silicate can, contrary to prior teaching, be advantageously used as the radiant heat barrier, or opacifier, in practicing the present invention, whereas the heat conduction barrier is mainly formed by the finely divided silica between the perlite particles.

As regards the milled mixture density, $\rho$, the optimum above also generally holds at 20 percent silica. The density change becomes much less significant as the pyrogenic silica is increased for example from 20 to 30 percent.

In other tests referring to table II, it was shown that varying mixtures of expanded perlite and pyrogenic silica were in all instances more effective insulations than either powder alone.

Figure 2:
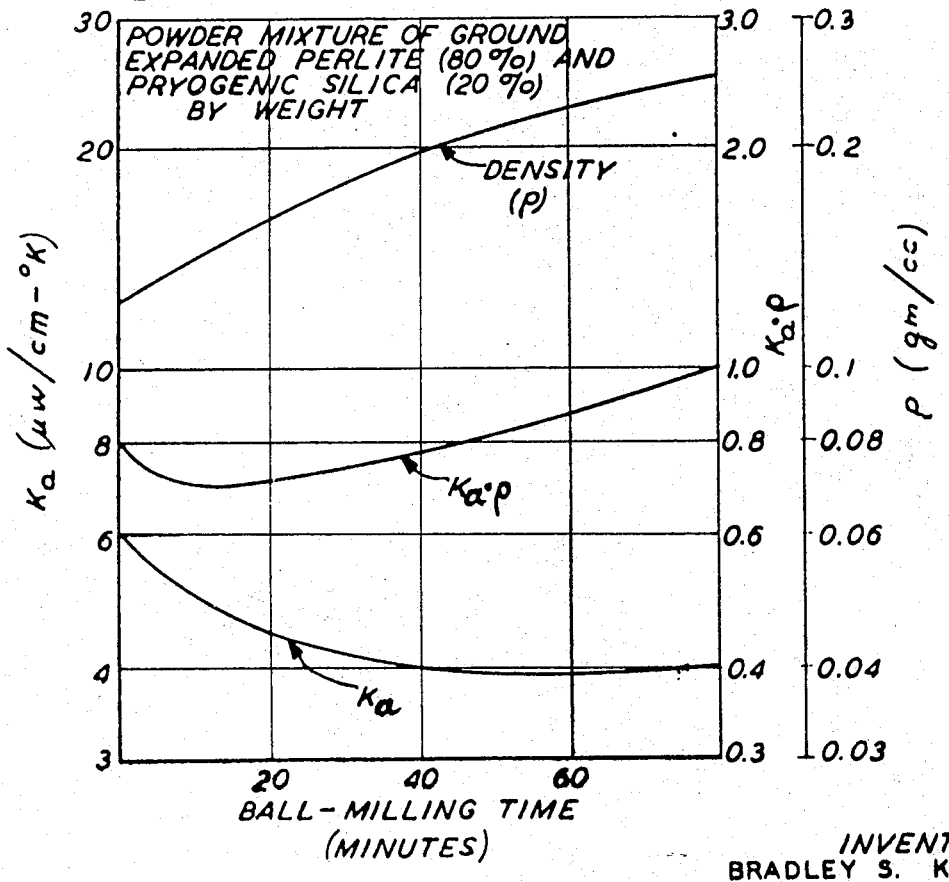
FIG. 2 is a graphical comparison of insulation mixture properties in relation to relative milling time.

The relation of relative milling time (using the small laboratory ball mill above) to both physical ($\rho$) and thermal ($k_a$) properties of a mixture of 80 percent perlite and 20 percent silica (Cab-O-Sil) by weight, is graphically indicated by the logarithmic chart of FIG. 2. In these tests, good $k_a$ values of around four were achieved in from 30 to 40 minutes of milling without significantly increasing the mixture density. The product curve, $k_a \cdot \rho$, within this milling period also indicates good practical performance.

Figure 3:
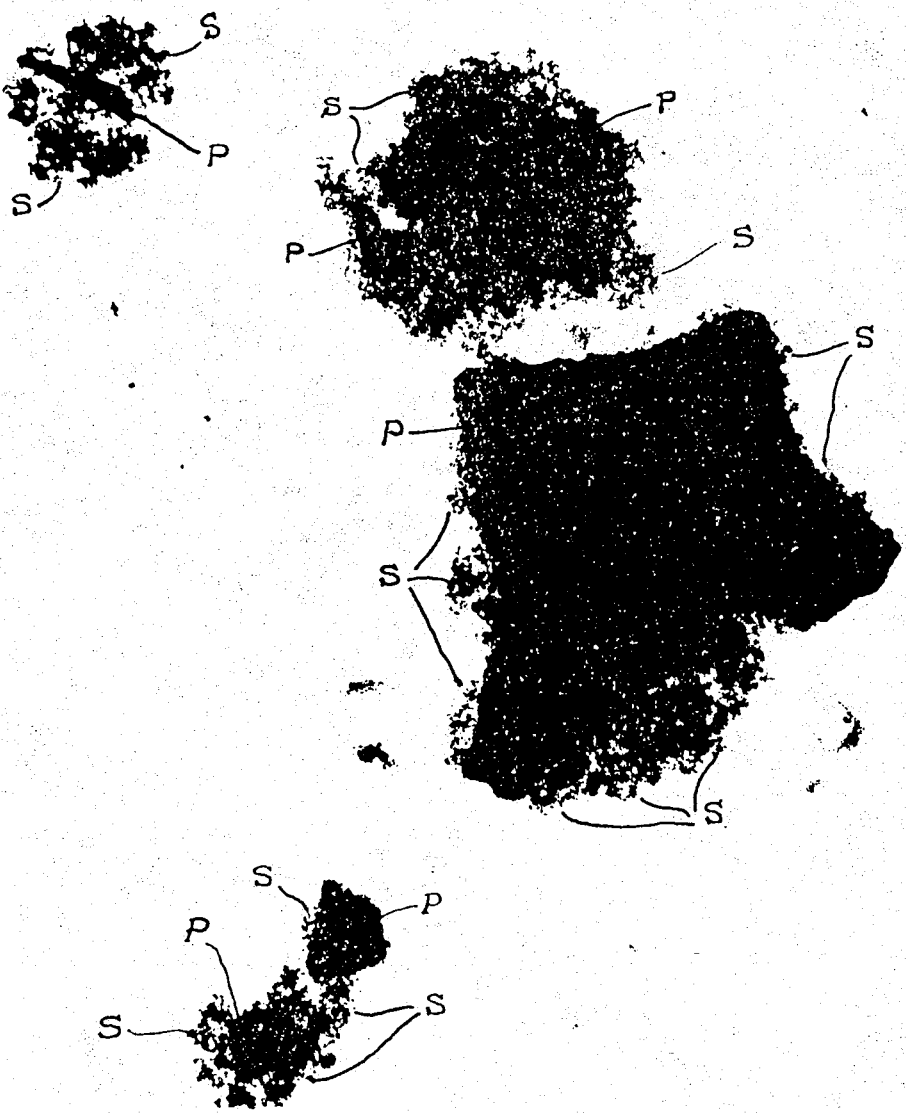
FIG. 3 is a photomicrograph of a typical specimen of insulation powder embodying the invention, consisting of a ball-milled mixture of perlite opacifier and pyrogenic silica.

For determining the physical nature of the markedly improved impact-milled mixtures above, herein referred to as "-milled mixtures," electron photomicrographs were made of various mixture specimens prepared as dry-mounted. It was then discovered that the milling in addition to thoroughly mixing the powders, produced an unusual and unexpected result in the disposition of the pyrogenic silica. FIG. 3 having a magnification, ×15,000,) shows a typical specimen of a table I mixture, 80 percent perlite and 20 percent pyrogenic silica by weight, and milled for about 1 hour, wherein the comparatively large particles of ground expanded perlite, seen as irregularly shaped thin platelets, P, are physically enveloped and isolated from each other by interposed comparatively small agglomerates of the pyrogenic silica S. Closer inspection shows that the agglomerates actually envelop as coatings the respective perlite particles and that a conducting path through the powder insulation is limited necessarily to a large number of point contacts between the minute particles of ultrafine pyrogenic silica, and the perlite platelets. This would account for the high resistance of the milled mixture to heat transfer by conduction. Moreover, the enveloping agglomerates on the perlite particles are found to be stable coatings, rather than loose material within interstitial spaces. The milled mixture of the invention therefore, is seen to constitute a new and improved powder insulation, not heretofore known in the powder insulation art.

The theoretical reasons for this stable union of perlite and pyrogenic silica are not presently known. It is believed that during the milling process, wherein the particles of perlite are further ground and the two component powders are forcibly brought by impact into close contact, an environment is established wherein "van der Waals forces" cause the extremely fine particles of the pyrogenic silica agglomerates to cling to the perlite particles. Discussions on the formation of agglomerates appear in two published papers by Meissner et al., "Spontaneous Pelletization in Fine Powders" and "Rate of Pelletization of Zinc Oxide Powders," in I & E C Process Design and Development, July 1964 and Jan. 1966, respectively.

Figure 4:
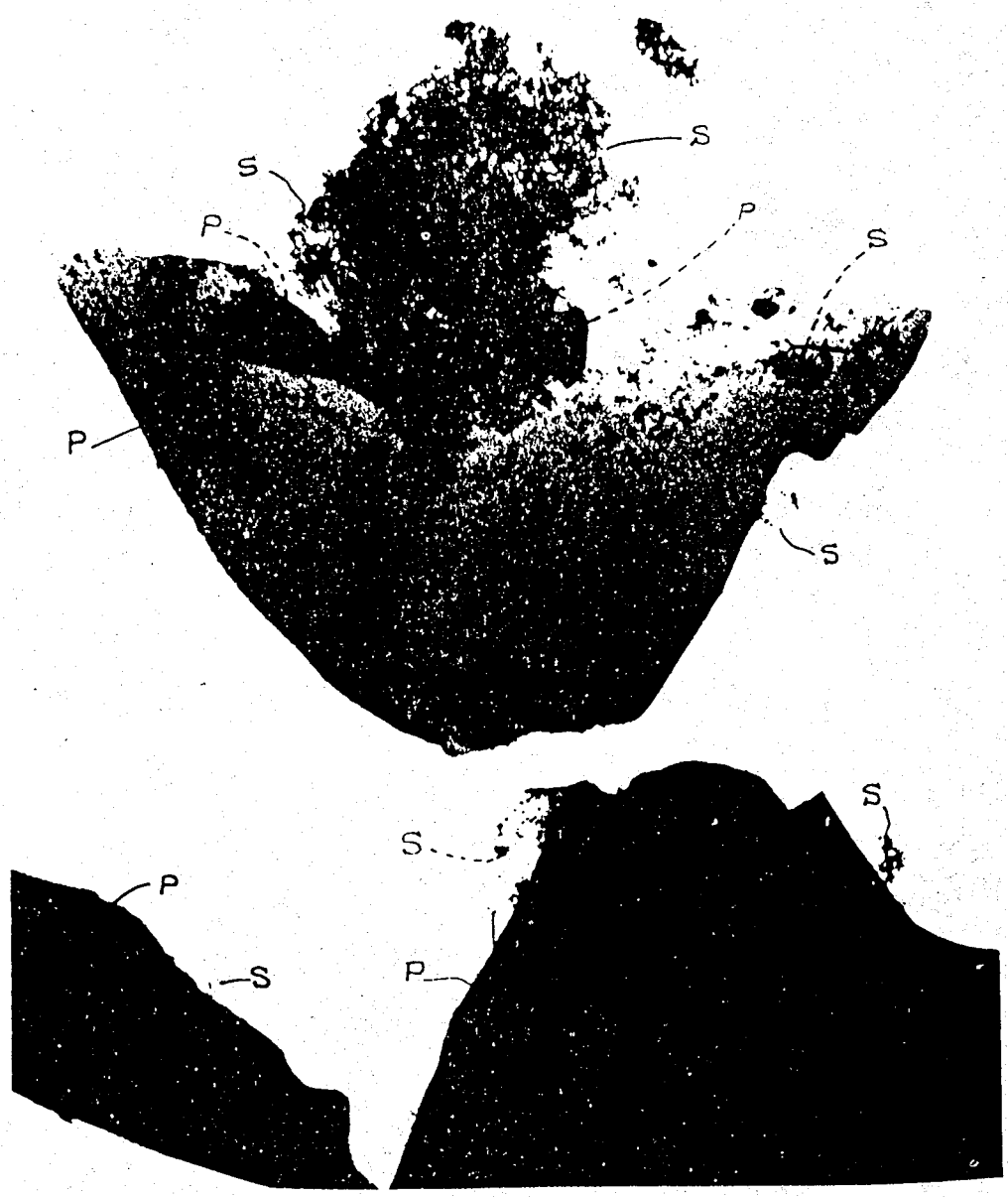
FIG. 4 is a photomicrograph of a typical unmilled specimen of essentially the same mixture.

In FIG. 4, the photomicrograph (×15,000) shows a typical specimen of an ordinary unmilled mixture of about 80 percent ground expanded perlite P and 20 percent pyrogenic silica S, by weight. The powders were mixed by vigorously shaking within a container for about 5 minutes. Here, it is seen that the perlite particles P have no silica agglomerate envelopes or coatings as in FIG. 3, and that the silica S is generally dispersed in comparatively large agglomerates, but one of which appears within the limited area of the photomicrograph. The $k_a$ values of this mixture correspond generally to those of table II, above.

Figure 5:
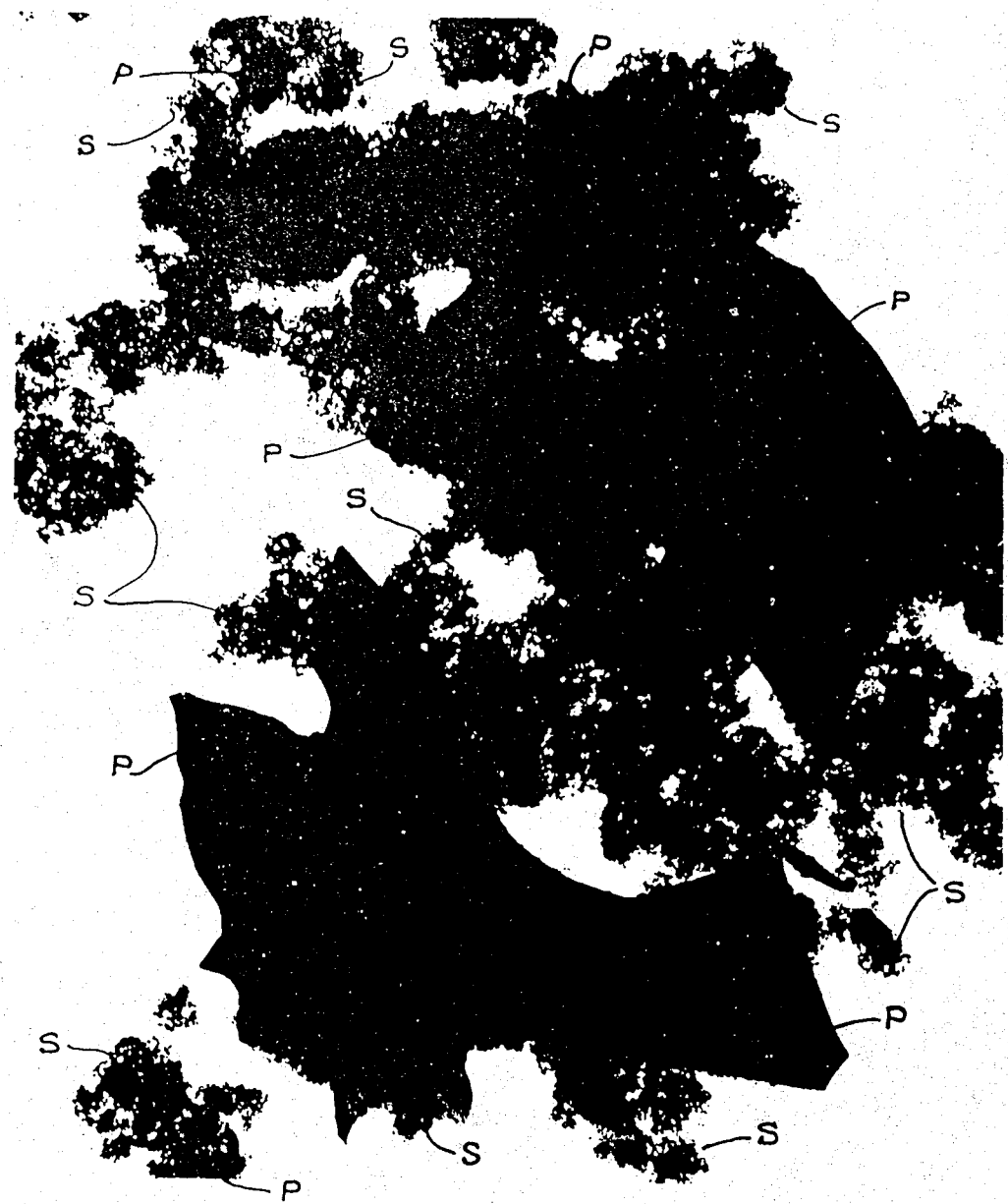
FIG. 5 is a photomicrograph of a typical specimen of essentially the same mixture of FIG. 3, processed in different impact-milling apparatus.

Alternative methods used for impact-milling the perlite and silica powder mixtures above, revealed that significantly improved $k_a$ values can be achieved, depending on the mechanical characteristics of the apparatus used. For example, a perlite-silica powder mixture similar to that in FIG. 4 above, was milled within a large "blending" machine having contrarotating blades operating at about 2,000 r.p.m. Where the "blending" above, was extended to about 20 minutes to one-half hour, significant amounts of silica in small agglomerates tended to mingle more uniformly in the general areas between the perlite. This is shown in the photomicrograph of FIG. 5. Although this interposed disposition of silica in small broken agglomerates was quite different from the perlite envelope or coating of FIG. 1, the mixture resulting from this "extended blending" showed a significantly improved $k_a$ value, namely about 4.6, over the ordinary mix, but was not equal in thermal efficiency to the best quality milled mixtures tested. Such extended blending milled mixtures where they lend themselves to low-cost bulk production, may therefore be useful in applications where optimum insulation efficiency is not required. "blender" In another impact-milling test, a small, high-speed beverage "blender" of well-known type was used for milling essentially the same mixture as in FIG. 4, namely, 80 percent ground expanded perlite and 20 percent pyrogenic silica (Cab-O-Sil). The improvements in $k_a$ values with the machine were striking; after 10 minutes of "blending," the $k_a$ value had decreased to 4.3, and when the blending was extended to 30 minutes, $k_a$ had further decreased to the value 3.6. Photomicrographs showed that the milling effect of this apparatus was in general similar to that of the ball mill, i.e., the perlite particles, especially of the 30-minutes test, were effectively isolated by small silica agglomerates.

Figure 6:
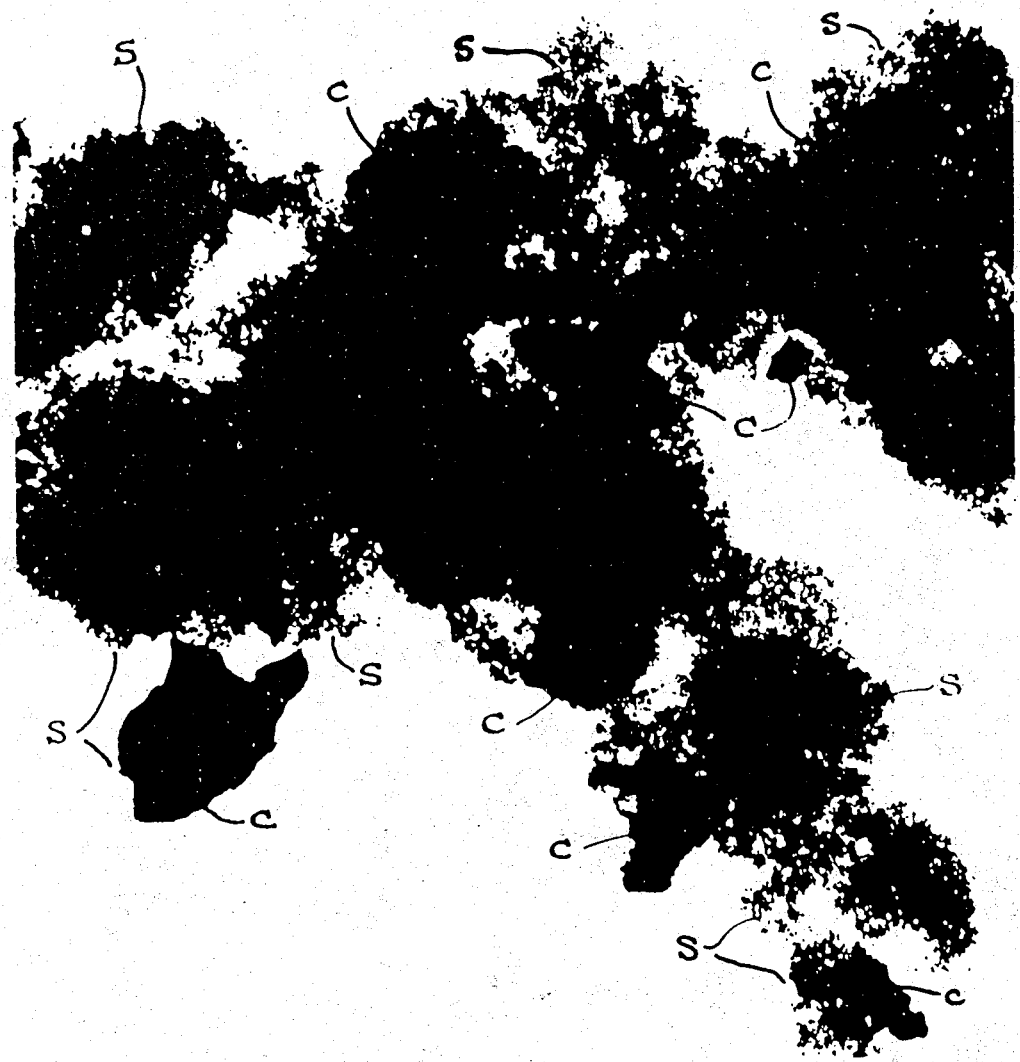
FIG. 6 is a photomicrograph of a typical specimen of another insulation powder embodying the invention consisting of a ball-milled mixture of expanded carbon opacifier and pyrogenic silica.

The milled mixtures of the present invention are not limited to the use of a dielectric material such as perlite for the opacifier. The photomicrograph of FIG. 6 (×15,000), shows a typical specimen of a ball-milled mixture of semiconductor particles C, namely expanded carbon, and pyrogenic silica S, generally in proportion by weight, 70 percent expanded carbon and 30 percent silica. Expanded carbon has low density as compared with carbon black and graphite for example, and consists of small porous particles having good opacifier properties and also an inherently low solid conduction component. It is inexpensive and available commercially under the trade name "Nerofil." In mixtures of the invention its optimum concentration is from about 60 to 90 percent by weight. Here also, stable agglomerates of pyrogenic silica envelop and isolate the expanded carbon particles from each other. This milled mixture has very good thermal properties, i.e., a low $k_a$ value of 3.4 for the sample above, and although not strictly compatible with oxygen, is useful for insulating insert gases such as helium, nitrogen or argon where risk of accidental explosion is absent. Furthermore, the mixture is especially useful in evacuated insulation as the high gas-adsorptive capacity of expanded carbon greatly improves the insulation tolerance for residual gases in the vacuum space.

As indicated above, the opacifier of the present invention can be selected from a group of dielectric and semiconductor materials that have suitable vacuum properties and that can conveniently be reduced to small-particle powder. In general, refractory dielectric powders such as perlite at optimum concentrations are excellent opacifiers. Further examples of dielectric opacifiers having properties lending themselves especially to use in milled mixtures of the invention include calcium silicates of fine powder grades that are available commercially. To such powders known by trade names "Cab-O-Lite P–1" and "Micro-Cel T–2," were separately used as opacifiers with pyrogenic silica, 80:20 percent proportion by weight, respectively, in milled mixtures. In the first mixture, a $k_a$ value of 4.0 and density of 0.52 g./cc. were achieved; in the second mixture exceptionally good properties were achieved, namely, a $k_a$ value of 3.7 and density of 0.20 g./cc. The latter represents an oxygen-compatible insulation powder comparable thermally with the highest grade opacified insulation powders presently known. Experimental tests have shown that other refractory dielectric powders also have effective opacifier properties. Magnesium carbonate, sodium chloride, attapulgus clay, magnesium oxide and silica gel are examples in this group.

Pyrogenic silica which has exceptionally high resistance to solid phase heat conduction, is preferred as the carrier in the milled mixtures above; however, it will be understood that other ultrafine, refractory materials having comparable properties can also be used. Where other carriers are used, the criteria in general is low $k_a$ and $\rho$ values, rather than any specific disposition in the mixture of the carrier and opacifier particles. However, the performance of such carriers in milled mixtures is unpredictable, and only by experimental tests in specific milling apparatus can the final mixture properties be determined. For example, perlite and an ultrafine aluminum oxide carrier powder in 80:20 percent proportion respectively, by weight, ball-milled for 1 hour, yielded a mixture that, notwithstanding isolation coating of perlite particles by the carrier, had impractically high density. In further example, pyrogenic silicas having very similar ultimate particle sizes and bulk densities, but made by different manufacturers, have been found to exhibit somewhat different characteristics, e.g. optimum concentrations and optimum milling times. In all the mixtures of the invention, both the opacifier and carrier are preferably of refractory, i.e. comparatively high melting point materials.

An important aspect of the invention is that is lends itself to the reduction of solid phase heat conduction in well-evacuated insulation powders. Residual gas tends to increase heat transfer by conduction and its presence cannot always be avoided, but its effect can be minimized by insulation powders of the invention. Evacuated powder insulations can tolerate higher residual gas pressure for effective operation than other evacuated insulations, and therefore do not require as perfect a vacuum. In general, the finer the powder the greater is the tolerance for imperfect vacuum. In the mixtures of the invention, the tolerance for residual gas is especially good as the fine carriers are used in significant volume; pyrogenic silica for example, is one of the finest powders known. The opacifiers also contribute to good tolerance as ground expanded perlite and expanded carbon yield fine dense powders, although coarse as compared with the carrier powders. When the opacifier is expanded carbon, this material as indicated above, significantly builds up even higher tolerance to residual gases because of its effectiveness as a "getter."

Although the invention has special significance in well-evacuated insulation powders as mentioned above, it is also useful in unevacuated systems such as in large tanks where maintenance of a good vacuum is not practical.

Having set forth the invention in what is considered to be the best embodiment thereof, it will be understood that changes may be made in the method and product as above set forth without departing from the spirit of the invention or exceeding the scope thereof as defined in the following claims.

We claim:

1. The method of making a thermal insulating powder for a cryogenic insulation system, which comprises mixing a finely comminuted opacifier material selected from the group of refractory materials consisting of inorganic silicates and expanded carbon, with a carrier powder of finely divided silica having high resistance to heat conduction transfer, and consisting of particles of not more than 0.1 micron in major dimension and dry bulk densities of less than 0.1 grams per cubic centimeter, the amount of carrier powder constituting 5 to 40 percent of the mixture by weight, and subjecting the mixture to forcible impact coincident with agitation thereof, until the opacifier particles respectively, are substantially physically isolated from each other by carrier powder.

2. THe method as specified in claim 1 wherein the isolating carrier powder forms agglomerates about the respective opacifier particles.

3. The method as specified in claim 1 wherein the opacifier consists essentially of perlite.

4. The method as specified in claim 1 wherein the opacifier is ground expanded perlite and the carrier is pyrogenic silica, and the mixture is impact-milled for a preselected period of time.

5. The method as specified in claim 1 wherein the opacifier consists essentially of porous carbonaceous particles.

6. The method as specified in claim 4 wherein the mixture is processed in a ball mill.

7. In a low temperature insulating system, a thermal insulating powder consisting of a milled mixture of an opacifier powder and a carrier powder, the opacifier being selected from the group of refractory materials consisting of inorganic silicates and expanded carbon, and the carrier constituting 5 to 40 percent of the mixture by weight and consisting of ultrafine refractory silica having very high resistance to heat transfer by conduction, and forming on the opacifier particles respectively, a stable encompassing envelope that physically and thermally isolates the particles from each other.

8. A thermal insulating powder as specified in claim 8 wherein the carrier envelop is in the form of stable agglomerates on the opacifier particle surfaces and interposed between the particles for preventing therebetween direct heat conduction.

9. A thermal insulating powder as specified in claim 8 wherein the carrier is pyrogenic silica.

10. A thermal insulating powder as specified in claim 8 wherein the opacifier is ground expanded perlite.

11. A thermal insulating powder as specified in claim 8 wherein the opacifier consists essentially of refractory expanded carbon particles.

12. In an evacuated insulation system, the method of insulating a vessel containing oxygen-rich material at cryogenic temperatures and having an outer jacket chamber subject to evacuation, which comprises:
 a. mixing an opacifier powder consisting essentially of ground expanded perlite with an ultrafine carrier powder consisting essentially of pyrogenic silica and constituting 5 to 40 percent of the mixture by weight,
 b. agitating under impact the mixture until the carrier powder is effectively interposed between the respective opacifier particles for physically and thermally isolating the particles from each other,
 c. filling the outer chamber with the resulting oxygen-compatible powder mixture, and
 d. reducing the chamber pressure to below approximately 1,000 microns of mercury absolute.

13. A thermal insulating powder for low-temperature systems consisting of a mixture of a dielectric opacifying powder consisting essentially of perlite and a carrier powder consisting essentially of finely divided silica, the opacifying powder being of particle size from 1 to 500 microns in major dimension, and dry bulk densities of from 0.1 to 0.8 grams per cubic centimeter, and the carrier powder being of refractory material formed as agglomerates having particles not more than 0.1 micron in major dimension and dry bulk densities of less than 0.1 grams per cubic centimeter and constituting between 5 and 40 percent by weight of the mixture, the carrier agglomerates being disposed in the mixture between opacifier particles for blocking heat transfer by conduction between the opacifier particles.

14. A thermal insulating powder as specified in claim 13 wherein the opacifier is ground expanded perlite and the carrier powder is pyrogenic silica.

* * * * *

UNITED STATES PATENT OFFICE
CERTIFICATE OF CORRECTION

Patent No. 3,625,896                    Dated December 7, 1971

Inventor(s) BRADLEY S. KIRK and CHESTER B. DeSAVIGNY

It is certified that error appears in the above-identified patent and that said Letters Patent are hereby corrected as shown below:

Col.1, line 40, "A" first occurrence should be deleted.

Col.3, line 2, "Cab-OlSil" should read -- Cab-O-Sil --.

Col.4, line 47, after "X15,000," delete ")" .

Col.5, line 36, "blender" should be deleted.

line 40, "the" second occurrence should read -- this --.

line 67, "sert" should read -- ert --.

Col.6, line 8, "80:20" should read -- 80-20 --.

line 32, "80:20" should read -- 80-20 --.

Col.7, line 11, "THe" should read -- The --.

line 35, "in claim 8" should read -- in claim 7 --.

line 36, "envelop" should read -- envelope --.

Signed and sealed this 20th day of June 1972.

(SEAL)
Attest:

EDWARD M. FLETCHER, JR.          ROBERT GOTTSCHALK
Attesting Officer                Commissioner of Patents